US010294877B2

(12) United States Patent
Arima et al.

(10) Patent No.: US 10,294,877 B2
(45) Date of Patent: May 21, 2019

(54) STRADDLE-TYPE VEHICLE

(71) Applicant: Kawasaki Jukogyo Kabushiki Kaisha, Kobe-shi, Hyogo (JP)

(72) Inventors: Hisatoyo Arima, Himeji (JP); Takahiro Ono, Kobe (JP); Kunihiro Tanaka, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 87 days.

(21) Appl. No.: 15/525,908

(22) PCT Filed: Oct. 13, 2016

(86) PCT No.: PCT/JP2016/004560
§ 371 (c)(1),
(2) Date: May 10, 2017

(87) PCT Pub. No.: WO2017/104098
PCT Pub. Date: Jun. 22, 2017

(65) Prior Publication Data
US 2017/0363023 A1 Dec. 21, 2017

(30) Foreign Application Priority Data
Dec. 18, 2015 (JP) .................. 2015-247755

(51) Int. Cl.
F01N 3/00 (2006.01)
F02D 35/00 (2006.01)
(Continued)

(52) U.S. Cl.
CPC .......... F02D 35/0015 (2013.01); B62M 7/02 (2013.01); F01N 1/02 (2013.01); F01N 3/10 (2013.01);
(Continued)

(58) Field of Classification Search
CPC ....................... F01N 2560/025; F01N 2590/04
See application file for complete search history.

(56) References Cited

U.S. PATENT DOCUMENTS 5,661,972 A * 9/1997 Katoh ................. F02D 41/1441
60/276
5,832,723 A * 11/1998 Iwata .................... F01N 13/008
60/276
(Continued)

FOREIGN PATENT DOCUMENTS

JP S56129512 U 10/1981
JP S6043112 U 3/1985
(Continued)

OTHER PUBLICATIONS

Tsuchiya Y., Journal No. 2006-505611, Journal of Technical Disclosure, Japan Institute of Invention and Innovation, Oct. 25, 2006, 3 pages. (See Non-Patent Literature Document 2, International Search Report Issued in Application No. PCT/JP2016/004560 for Explanation of Relevance).
(Continued)

Primary Examiner — Audrey K Bradley
Assistant Examiner — Anthony Ayala Delgado
(74) Attorney, Agent, or Firm — Alleman Hall Creasman & Tuttle LLP

(57) ABSTRACT

A straddle-type vehicle comprises an engine which generates driving power and emits an exhaust gas; an exhaust device including: a catalyst which cleans the exhaust gas, an inner tube in which the catalyst is disposed and through which the exhaust gas flows, the inner tube extending to a location downstream of the catalyst; and an outer tube which covers an outer peripheral surface of the inner tube in an axial direction of the inner tube, and has a muffling space through which the exhaust gas discharged from the inner tube is flowed to reduce an exhaust noise radiated from the
(Continued)

engine; at least one exhaust pipe through which the exhaust gas is led to the catalyst; and a downstream oxygen sensor which detects an oxygen concentration of the exhaust gas after flowing through the catalyst, at a location downstream of the catalyst in the inner tube.

13 Claims, 7 Drawing Sheets

(51) Int. Cl.
*B62M 7/02* (2006.01)
*F01N 3/24* (2006.01)
*F01N 13/00* (2010.01)
*F01N 13/20* (2010.01)
*F01N 1/02* (2006.01)
*F01N 3/10* (2006.01)
*F02D 41/14* (2006.01)

(52) U.S. Cl.
CPC ............... *F01N 3/24* (2013.01); *F01N 13/00* (2013.01); *F01N 13/20* (2013.01); *F02D 41/1439* (2013.01); *F02D 41/1441* (2013.01); *F02D 41/1454* (2013.01); *F01N 2470/00* (2013.01); *F01N 2560/025* (2013.01); *F01N 2590/04* (2013.01); *Y02A 50/2322* (2018.01)

(56) References Cited

U.S. PATENT DOCUMENTS

| | | | | |
|---|---|---|---|---|
| 6,213,827 | B1* | 4/2001 | Hattori | B63H 21/32 114/55.5 |
| 8,678,038 | B2* | 3/2014 | Adachi | F01N 13/008 138/109 |
| 9,382,832 | B2* | 7/2016 | Bowers | F01N 13/008 |
| 2018/0051617 | A1* | 2/2018 | Sasaki | F01N 3/24 |

FOREIGN PATENT DOCUMENTS

| | | |
|---|---|---|
| JP | H04266579 A | 9/1992 |
| JP | H08254522 A | 10/1996 |
| JP | 2009127511 A | 6/2009 |
| JP | 5609434 B2 | 10/2014 |
| WO | 2005075805 A1 | 8/2005 |
| WO | 2016140336 A1 | 9/2016 |

OTHER PUBLICATIONS

ISA Japan Patent Office, International Search Report Issued in Japanese Application No. PCT/JP2016/004560, Nov. 29, 2016, WIPO, 2 pages.

* cited by examiner

STRADDLE-TYPE VEHICLE

TECHNICAL FIELD

The present invention relates to a straddle-type vehicle.

BACKGROUND ART

For example, a straddle-type vehicle includes an exhaust device which cleans an exhaust gas emitted from an engine in such a manner that a catalyst is caused to contact the exhaust gas. In the straddle-type vehicle, to reduce an exhaust noise radiated from the engine by efficiently utilizing a limited space, a muffling space is formed inside the exhaust device, in some cases. By securing this muffling space, the straddle-type vehicle can effectively reduce the exhaust noise radiated from the engine.

For example, as disclosed in Patent Literature 1, in some cases, the straddle-type vehicle is provided with an oxygen sensor for detecting an oxygen concentration of the exhaust gas, at a location that is upstream of the catalyst of the exhaust device, in a flow direction of the exhaust gas.

CITATION LIST

Patent Literature

Patent Literature 1: Japanese Patent No. 5609434

SUMMARY OF INVENTION

Technical Problem

An object of the present invention is to provide a straddle-type vehicle which can effectively reduce an exhaust noise radiated from an engine by an exhaust device formed with a muffling space, and can accurately detect an oxygen concentration of the exhaust gas by an oxygen sensor inside the exhaust device.

Solution to Problem

To solve the above-described problem, a straddle-type vehicle according to an aspect of the present invention comprises an engine which generates driving power for allowing the straddle-type vehicle to travel and emits an exhaust gas; an exhaust device including: a catalyst which contacts the exhaust gas to clean the exhaust gas, an inner tube in which the catalyst is disposed in an inner passage thereof through which the exhaust gas flows, the inner tube extending to a location that is downstream of the catalyst in a flow direction of the exhaust gas; and an outer tube which covers an outer peripheral surface of at least a region of the inner tube in an axial direction of the inner tube, and has a muffling space through which the exhaust gas discharged from an exit of the inner tube is flowed to reduce an exhaust noise radiated from the engine; at least one exhaust pipe through which the exhaust gas emitted from the engine is led to the catalyst; and a downstream oxygen sensor which is disposed to detect an oxygen concentration of the exhaust gas flowing through the inner passage of the inner tube after flowing through the catalyst, at a location that is downstream of the catalyst in the inner passage of the inner tube.

In accordance with this configuration, since the exhaust gas discharged from the exit of the inner tube is flowed through the muffling space, the exhaust gas is expanded in the muffling space and its energy is attenuated. In this way, the exhaust device can effectively reduce the exhaust noise radiated from the engine. Also, since the downstream oxygen sensor detects the oxygen concentration of the exhaust gas flowing through the inner passage of the inner tube after flowing through the catalyst, at a location that is downstream of the catalyst in the inner passage of the inner tube, the oxygen concentration of the exhaust gas which has been introduced into the inner tube and has contacted the catalyst can be accurately detected before the exhaust gas is discharged into the muffling space through the exit of the inner tube.

The downstream oxygen sensor may include an oxygen detecting section which detects the oxygen concentration of the exhaust gas, the outer tube may be provided with a first insertion hole into which the downstream oxygen sensor is insertable, and in a state in which the downstream oxygen sensor is inserted into the first insertion hole, the oxygen detecting section may be exposed in the inner passage of the inner tube.

In accordance with this configuration, since the downstream oxygen sensor is inserted into the first insertion hole provided in the outer tube, the oxygen detecting section of the downstream oxygen sensor can be easily disposed in the inner passage of the inner tube covered with the outer tube, from an outside region of the outer tube.

The outer tube may be provided with a recess which is recessed (depressed) toward the inner tube, the recess may be provided with the first insertion hole, and in a state in which the downstream oxygen sensor is inserted into the first insertion hole, the downstream oxygen sensor may be mounted on the outer tube.

In accordance with this configuration, the downstream oxygen sensor is mounted on the outer tube in a state in which the downstream oxygen sensor is inserted into the first insertion hole provided in the recess. Therefore, for example, the downstream oxygen sensor can be easily made close to a location that is downstream of the catalyst in the inner tube covered with the outer tube. In addition, the downstream oxygen sensor can be easily mounted on the outer tube even in a case where the dimension of the downstream oxygen sensor in a direction from the outer tube toward the inner tube is small.

The inner tube is provided with a second insertion hole into which the downstream oxygen sensor is insertable, a pipe member extending from the inner tube toward the outer tube and having an insertion space into which the downstream oxygen sensor is insertable, may be joined to a peripheral edge of the second insertion hole of the inner tube and a peripheral edge of the first insertion hole of the outer tube, the exhaust device may have a structure in which a displacement of each of a first joining portion of the outer tube and a second joining portion of the inner tube, from a reference position, is permissible, the first joining portion and the second joining portion being joined to the pipe member, and an amount of the permissible displacement from the reference position in the axial direction of the inner tube, of at least one of the first joining portion and the second joining portion, may be set to be greater than that in a radial direction of the inner tube, of at least one of the first joining portion and the second joining portion.

In a case where the inner tube is heated by the high-temperature exhaust gas flowing through the inner passage of the inner tube and thermally expanded, the inner tube is sometimes thermally expanded to a greater degree in the axial direction of the inner tube than in the radial direction of the inner tube. In accordance with the above-described configuration, the amount of the permissible displacement from the reference position in the axial direction of the inner tube, of at least one of the first joining portion and the second joining portion, is set to be greater than that in the radial direction of the inner tube, of at least one of the first joining portion and the second joining portion. Therefore, for example, even in a case where a thermal expansion difference between the inner tube and the outer tube occurs due to a temperature difference between the exhaust gas which contacts the inner tube and the exhaust gas which contacts the outer tube, and thereby each of the first joining portion and the second joining portion is displaced from the reference position to a greater degree in the axial direction of the inner tube than in the radial direction of the inner tube, damages to each of the first joining portion and the second joining portion can be prevented. In this way, it becomes possible to well prevent the damages to the first joining portion or the second joining portion.

The downstream oxygen sensor may include a protruding portion protruding outward from the outer tube, and when a vehicle body is viewed from a front (in the front view), the protruding portion may extend upward from the outer tube in such a manner that the protruding portion is tilted with respect to a horizontal direction as the protruding portion extends outward in a vehicle width direction.

In accordance with this configuration, when the vehicle body is viewed from the front (in the front view), the protruding portion of the downstream oxygen sensor extends upward from the outer tube in such a manner that the protruding portion is tilted with respect to a horizontal direction. Therefore, even in a state in which the vehicle body is banked, it becomes possible to well prevent a situation in which the downstream oxygen sensor interferes with a road surface or other obstacles and a failure or a break occurs in the downstream oxygen sensor.

The outer tube may include a first member and a second member which are joined to each other.

In accordance with this configuration, since the outer tube includes a first member and a second member which are joined to each other, the downstream oxygen sensor can be easily externally mounted on the inner tube, through, for example, a space formed between the joining portion of the first member and the joining portion of the second member, before the first member and the second member are joined to each other. By joining the first member and the second member to each other after the downstream oxygen sensor is mounted on the inner tube, the exhaust device can be easily manufactured.

The downstream oxygen sensor may be mounted on the outer tube at a location that is apart from a joining portion of the first member and a joining portion of the second member which are joined to each other.

In accordance with this configuration, since the downstream oxygen sensor is mounted on the outer tube at a location that is apart from the joining portion of the first member and the joining portion of the second member which are joined to each other, the shape of either the first member or the second member which does not include a mounting portion for the downstream oxygen sensor is not restricted by the mounting portion. Therefore, for example, the size of the muffling space can be easily increased by this member which does not include the mounting portion, and the outer tube can be designed more flexibly.

The first member may include a non-joining portion disposed at an intermediate portion of the joining portion of the first member in such a manner that the non-joining portion of the first member is apart from the second member, the second member may include a non-joining portion disposed at an intermediate portion of the joining portion of the second member in such a manner that the non-joining portion of the second member is apart from the first member, and in a state in which the non-joining portion of the first member and the non-joining portion of the second member are disposed to face each other, and the first member and the second member are joined to each other, a space may be formed between the non-joining portion of the first member and the non-joining portion of the second member, and the downstream oxygen sensor may be inserted into the space formed between the non-joining portion of the first member and the non-joining portion of the second member.

In accordance with this configuration, since the downstream oxygen sensor is inserted into the space formed between the non-joining portion of the first member and the non-joining portion of the second member, the shape of portions of the first member and the second member which are other than the non-joining portions are not restricted by mounting the downstream oxygen sensor. Thus, the outer tube can be designed more flexibly.

The straddle-type vehicle may further comprise: a monitoring unit which monitors an output signal of the downstream oxygen sensor, the downstream oxygen sensor may include a wire connected to the monitoring unit, and the wire may be disposed in an outside region of the outer tube.

In accordance with this configuration, since the wire of the downstream oxygen sensor is disposed in the outside region of the outer tube, the wire can be effectively protected from the high-temperature of the exhaust device.

The straddle-type vehicle may further comprise an upstream oxygen sensor, the inner tube may extend to a location that is upstream of the catalyst in the flow direction of the exhaust gas, and the upstream oxygen sensor may be disposed to detect the oxygen concentration of the exhaust gas flowing through the inner passage of the inner tube, at a location that is upstream of the catalyst, and a passage cross-section of the inner tube from a location of the inner tube at which the downstream oxygen sensor is mounted to a location of the inner tube at which the upstream oxygen sensor is mounted may have the same shape.

In accordance with this configuration, since the passage cross-section of the inner tube from a location of the inner tube at which the downstream oxygen sensor is mounted to a location of the inner tube at which the upstream oxygen sensor is mounted has the same shape, a difference in the flow direction between the exhaust gas whose oxygen concentration is detected by the downstream oxygen sensor and the exhaust gas whose oxygen concentration is detected by the upstream oxygen sensor can be reduced, and the detection value of the downstream oxygen sensor and the detection value of the upstream oxygen sensor can be easily compared to each other.

A passage cross-sectional area of the inner tube at a location of the inner tube at which the downstream oxygen sensor is mounted may be equal to a passage cross-sectional area of the inner tube at a location of the inner tube at which the upstream oxygen sensor is mounted.

In accordance with this configuration, since the passage cross-sectional area of the inner tube at a location of the inner tube at which the downstream oxygen sensor is mounted is equal to the passage cross-sectional area of the inner tube at a location of the inner tube at which the upstream oxygen sensor is mounted, it becomes possible to reduce a difference in the flow direction and flow speed between the exhaust gas whose oxygen concentration is detected by the downstream oxygen sensor and the exhaust gas whose oxygen concentration is detected by the upstream oxygen sensor. Therefore, the detection value of the downstream oxygen sensor and the detection value of the upstream oxygen sensor can be more easily compared to each other.

In the inner passage of the inner tube, a detection region of the downstream oxygen sensor, a region at which the catalyst is disposed, and a detection region of the upstream oxygen sensor may be located on a common axis line.

In accordance with this configuration, in the inner passage of the inner tube, the detection region of the downstream oxygen sensor, the region at which the catalyst is disposed, and the detection region of the upstream oxygen sensor are located on the common axis line. Therefore, compared to a case where the detection region of the downstream oxygen sensor, the region at which the catalyst is disposed, and the detection region of the upstream oxygen sensor are located on different axis lines in the inner passage of the inner tube, it becomes possible to further reduce the difference in the flow direction between the exhaust gas whose oxygen concentration is detected by the downstream oxygen sensor and the exhaust gas whose oxygen concentration is detected by the upstream oxygen sensor. Therefore, the oxygen concentration detected by the downstream oxygen sensor and the oxygen concentration detected by the upstream oxygen sensor can be accurately compared to each other.

According to another aspect of the present invention, a straddle-type vehicle comprises an engine which generates driving power for allowing the straddle-type vehicle to travel and emits an exhaust gas; an exhaust device including: a catalyst which contacts the exhaust gas to clean the exhaust gas, an inner tube in which the catalyst is disposed in an inner passage thereof through which the exhaust gas flows, the inner tube extending to a location that is upstream of the catalyst in a flow direction of the exhaust gas; and an outer tube which covers an outer peripheral surface of at least a region of the inner tube in an axial direction of the inner tube, and has a muffling space through which the exhaust gas discharged from an exit of the inner tube is flowed to reduce an exhaust noise radiated from the engine; at least one exhaust pipe through which the exhaust gas emitted from the engine is led to the catalyst; and an oxygen sensor which is disposed to detect an oxygen concentration of the exhaust gas flowing through the inner passage of the inner tube, at a location that is upstream of the catalyst in the inner passage of the inner tube.

In accordance with this configuration, since the exhaust gas discharged from the exit of the inner tube is flowed through the muffling space, the exhaust gas is expanded in the muffling space and its energy is attenuated. In this way, the exhaust device can effectively reduce the exhaust noise radiated from the engine. Also, since the oxygen sensor detects the oxygen concentration of the exhaust gas flowing through the inner passage of the inner tube, at a location that is upstream of the catalyst in the inner passage of the inner tube, the oxygen concentration of the exhaust gas which has been introduced into the inner tube can be accurately detected before the exhaust gas is discharged into the muffling space through the exit of the inner tube.

The engine may be disposed at a center of a vehicle body extending in a forward and rearward direction, the vehicle body being provided with the engine, the exhaust device, and the exhaust pipe, and when the vehicle body is viewed from a side, the catalyst may be disposed below the engine.

In accordance with this configuration, since the engine is disposed at the center of the vehicle body in the forward and rearward direction, and the catalyst is disposed below the engine, when the vehicle body is viewed from the side, a weight balance of the vehicle body in the forward and rearward direction can be improved. In addition, for example, the engine and the exhaust device can be compactly disposed in the vehicle body in such a manner that they are close to each other in the forward and rearward direction. In this way, the vehicle body can be designed more flexibly.

Advantageous Effects of Invention

In accordance with the present invention, it is possible to provide a straddle-type vehicle which can effectively reduce an exhaust noise radiated from an engine by an exhaust device formed with a muffling space, and can accurately detect an oxygen concentration of the exhaust gas by an oxygen sensor inside the exhaust device.

DESCRIPTION OF EMBODIMENTS

Embodiments of the present invention will be described with reference to the drawings. The stated directions are from the perspective of a rider straddling the vehicle body of a straddle-type vehicle 1. The terms "upstream" and "downstream" refer to upstream and downstream, respectively, in a flow direction of an exhaust gas.

(Embodiment 1)

Figure 1:
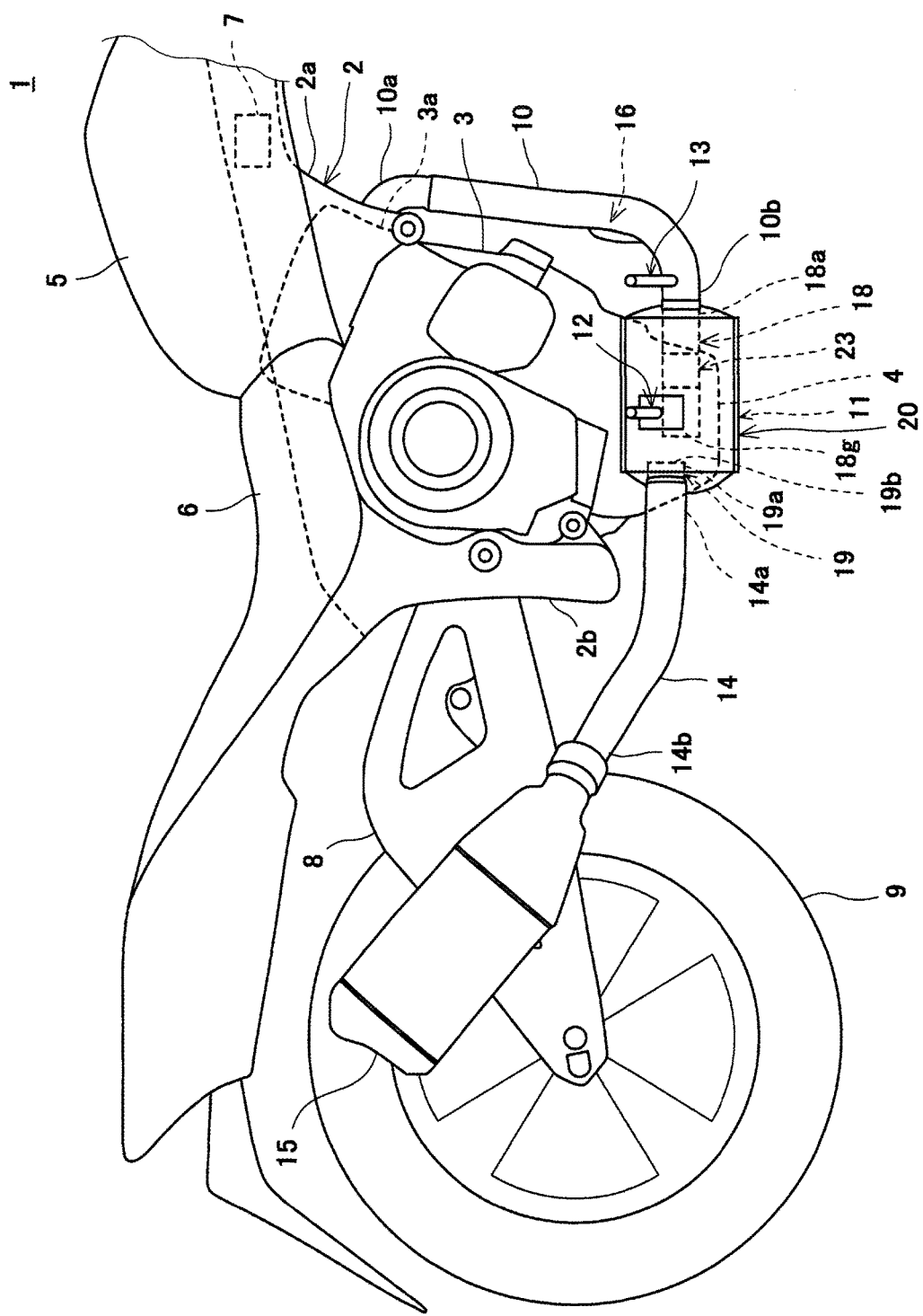
FIG. 1 is a right side view of the rear portion of a straddle-type vehicle according to Embodiment 1.

FIG. 1 is a right side view of the rear portion of the vehicle body of the straddle-type vehicle 1 according to Embodiment 1. As shown in FIG. 1, the straddle-type vehicle 1 is, for example, a motorcycle, and includes a vehicle body frame 2, an engine 3 which generates driving power for allowing the straddle-type vehicle 1 to travel, an oil pan 4, a fuel tank 5, a seat 6 which can be straddled by the rider, an ECU 7, a swing arm 8, a rear wheel 9, an exhaust pipe 10, an exhaust device 11, a downstream oxygen sensor 12, an upstream oxygen sensor 13, a connection pipe 14, and an exhaust muffler 15. The straddle-type vehicle 1 includes a pair of front forks, a front wheel, a handle, a cowling, and a head lamp, in a front portion (not shown) of the vehicle body.

The vehicle body frame 2 includes a main frame member 2a, and a pivot frame member 2b. The main frame member 2a extends in a forward and rearward direction of the vehicle body. The pivot frame member 2b extends downward from the main frame member 2a. The engine 3 outputs driving power for rotating the rear wheel 9. The engine 3 is disposed below the vehicle body frame 2, at a center portion in the forward and rearward direction, of the vehicle body extending in the forward and rearward direction. The engine 3 is supported on the vehicle body frame 2. An exhaust port 3a is provided at the upper portion of the engine 3. During running of the engine 3, an exhaust gas is emitted from the exhaust port 3a.

The oil pan 4 reserves therein lubricating oil which has lubricated the constituents inside the engine 3. The oil pan 4 is disposed below the engine 3. The fuel tank 5 reserves therein a fuel to be supplied to the engine 3. The fuel tank 5 is disposed above the vehicle body frame 2 and supported on the vehicle body frame 2. The seat 6 is disposed above the vehicle body frame 2 and behind the fuel tank 5, and supported on the vehicle body frame 2.

The ECU 7 is supported on the vehicle body frame 2, for example, at a location that is below the fuel tank 5. The ECU 7 is a monitoring unit which monitors signals output from sensors 12, 13. For example, the ECU 7 compares oxygen concentrations of the exhaust gas flowing through locations of an exhaust passage 16 (which will be described later) at which the sensors 12, 13 are disposed and diagnoses the state of a catalyst unit 23.

The swing arm 8 extends in the forward and rearward direction. The front end portion of the swing arm 8 is mounted on the pivot frame member 2b. The swing arm 8 is vertically pivotable around the front end portion on which the swing arm 8 is mounted on the pivot frame member 2b. The rear wheel 9 is rotatably mounted on the rear end portion of the swing arm 8. The driving power output from the engine 3 is transmitted to the rear wheel 9 via a driving power transmission mechanism (not shown).

The exhaust pipe 10 extends vertically at a location that is in front of the engine 3. An upstream end portion 10a of the exhaust pipe 10 is connected to the exhaust port 3a, while a downstream end portion 10b of the exhaust pipe 10 is connected to the exhaust device 11. In the straddle-type vehicle 1, the exhaust pipe 10 and a first inner tube 18 of the exhaust device 11 constitute the exhaust passage 16 through which the exhaust gas flows.

The exhaust device 11 reduces the exhaust noise radiated from the engine 3. In addition, the exhaust device 11 cleans the exhaust gas having flowed through the exhaust pipe 10 and discharges the exhaust gas. When the vehicle body is viewed from the side, for example, the exhaust device 11 is located below the engine 3. The exhaust device 11 includes the first inner tube 18, a second inner tube 19, an outer tube 20, and the catalyst unit 23.

Each of the first inner tube 18 and the second inner tube 19 has, for example, a straight-pipe shape, and extends in the forward and rearward direction. The first inner tube 18 and the second inner tube 19 are joined to the outer tube 20 in a state in which the first inner tube 18 and the second inner tube 19 are apart from each other. An upstream end portion 18a of the first inner tube 18 is connected to a downstream end portion 10b of the exhaust pipe 10. A downstream end portion 18g of the first inner tube 18 is disposed in the inner passage of the outer tube 20. At least one catalyst unit 23 is disposed in the inner passage of the first inner tube 18. The first inner tube 18 extends from a region that is upstream of the catalyst unit 23 to a region that is downstream of the catalyst unit 23. An upstream end portion 19b of the second inner tube 19 is disposed in the inner passage of the outer tube 20. A downstream end portion 19a of the second inner tube 19 is connected to an upstream end portion 14a of the connection pipe 14.

The outer tube 20 is a casing of the exhaust device 11, covering the outer peripheral surface of a region of the first inner tube 18, in an axial direction of the first inner tube 18. The outer tube 20 extends in the forward and rearward direction. The catalyst unit 23 is configured to contact the exhaust gas flowing through the inner passage of the first inner tube 18 to clean the exhaust gas. When the vehicle body is viewed from the side (in the side view), the catalyst unit 23 is disposed below the engine 3.

The downstream oxygen sensor 12 is disposed to be capable of detecting an oxygen concentration of the exhaust gas flowing through the inner passage of the first inner tube 18 after flowing through the catalyst unit 23, at a location that is downstream of the catalyst unit 23 of the exhaust passage 16, in the inner passage of the first inner tube 18. The upstream oxygen sensor 13 is disposed to be capable of detecting an oxygen concentration of the exhaust gas flowing through the inner passage of the exhaust pipe 10, at a location that is upstream of the catalyst unit 23, in the exhaust passage 16. The sensors 12, 13 are connected to the ECU 7. When the vehicle body is viewed from the side, the upstream oxygen sensor 13 is disposed to overlap with, for example, the oil pan 4. The connection pipe 14 is disposed behind the exhaust device 11, and extends in the forward and rearward direction. A downstream end portion 14b of the connection pipe 14 is connected to the exhaust muffler 15. The exhaust muffler 15 reduces the exhaust noise radiated from the engine 3. The exhaust muffler 15 is disposed behind the exhaust device 11.

Alternatively, the catalyst unit 23 may be disposed in the inner passage of the first inner tube 18, in a region of the first inner tube 18 in the axial direction of the first inner tube 18, which is not covered with the outer tube 20. Although in the present embodiment, one catalyst unit 23 is disposed in the inner passage of the first inner tube 18, two or more catalyst units 23 may be disposed in the inner passage of the first inner tube 18. In this case, it is sufficient that the downstream oxygen sensor 12 is located downstream of the catalyst unit 23 located at a most downstream side in the exhaust passage 16.

It is sufficient that the upstream oxygen sensor 13 is located upstream of the catalyst unit 23 located at a most upstream side in the exhaust passage 16. In a case where it is not necessary to detect the oxygen concentration of the exhaust gas flowing through the exhaust passage 16, at a location that is upstream of the catalyst unit 23, the upstream oxygen sensor 13 may be omitted.

In some cases, if a distance from the downstream oxygen sensor 12 to the downstream end of the first inner tube 18 is insufficient, there is a possibility that the exhaust gas discharged from the first inner tube 18 to a muffling space 21 which will be described later flows back from, for example, the downstream end of the first inner tube 18 to the location of the downstream oxygen sensor 12, during transient running of the engine 3.

In view of this, it is desired that the downstream oxygen sensor 12 be disposed in the inner passage of the first inner tube 18 at a location that is apart toward an upstream side from the downstream end of the first inner tube 18 (e.g., a location that is apart 100 mm or more toward an upstream side from the downstream end of the first inner tube 18).

If the downstream oxygen sensor 12 and the upstream oxygen sensor 13 are disposed in a region of the exhaust passage 16 which has a reduced cross-sectional area or a bent region of the exhaust passage 16, there may be a possibility that the downstream oxygen sensor 12 and the upstream oxygen sensor 13 detect the oxygen concentration of the exhaust gas flowing unstably.

In view of this, it is desired that the downstream oxygen sensor 12 and the upstream oxygen sensor 13 be disposed in a linear region of the exhaust passage 16 which has a constant passage cross-sectional area and a fixed passage cross-sectional shape and extends in a straight-line shape. Since the downstream oxygen sensor 12 and the upstream oxygen sensor 13 are disposed in the linear region of the exhaust passage 16 in this way, each of the downstream oxygen sensor 12 and the upstream oxygen sensor 13 detects the oxygen concentration of the exhaust gas flowing smoothly and stably. This makes it possible to accurately measure the oxygen concentrations of the exhaust gas.

Figure 2:
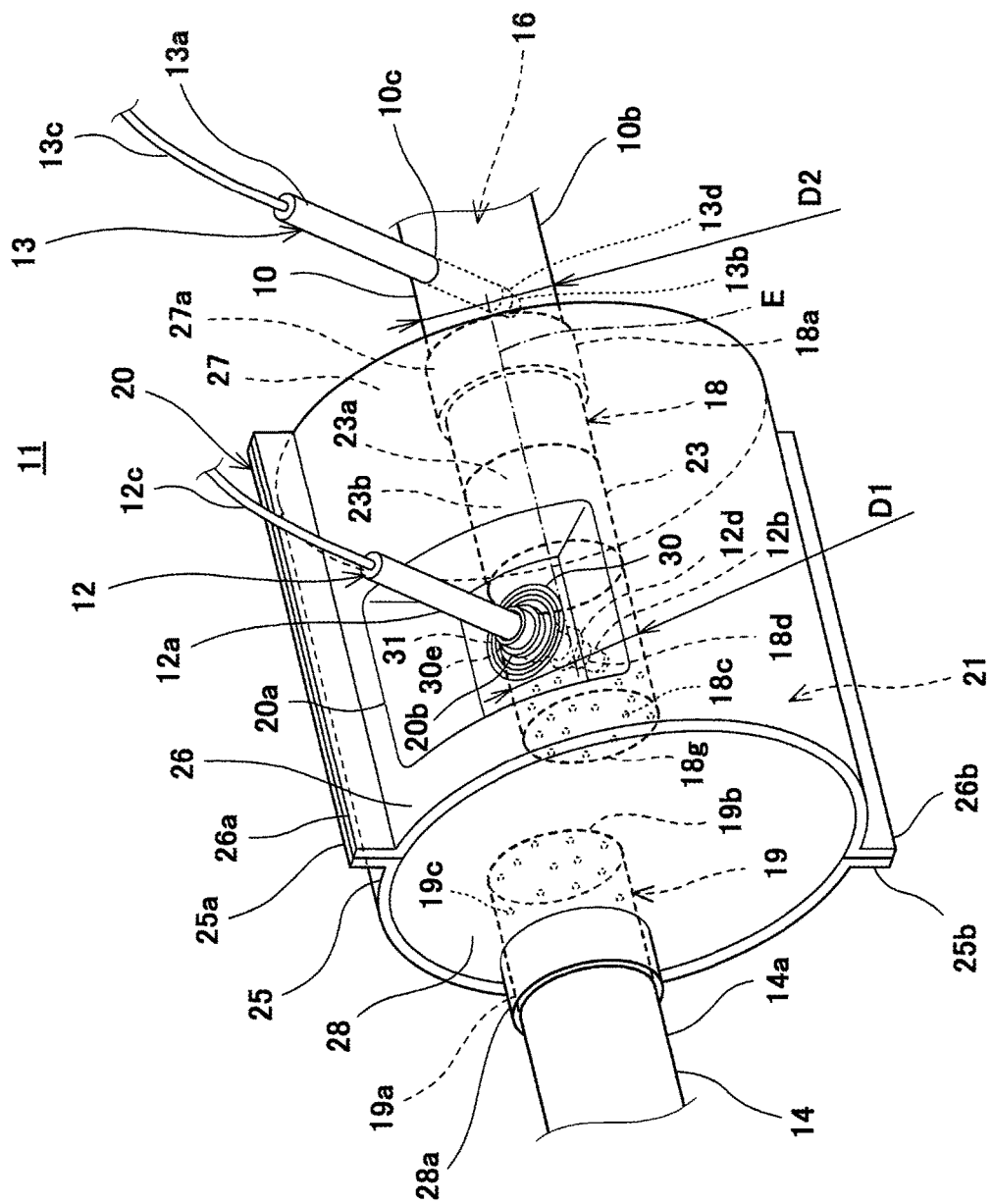
FIG. 2 is a perspective view of an exhaust device of FIG. 1, when viewed obliquely from the right and the rear.

FIG. 2 is a perspective view of the exhaust device 11 of FIG. 1, when viewed obliquely from the right and the rear. As shown in FIG. 2, the exhaust pipe 10 is provided with an insertion hole 10c into which the upstream oxygen sensor 13 is inserted. A female thread (not shown) is formed in the inner portion of the insertion hole 10c and is threadingly engageable with a male thread 13d of the upstream oxygen sensor 13.

The outer tube 20 has an inner volume greater than that of the first inner tube 18. The outer tube 20 covers the entire outer peripheral surface of the first inner tube 18 and the entire outer peripheral surface of the second inner tube 19. For example, the outer tube 20 has a substantially cylindrical shape extending in the forward and rearward direction. The shape of the outer tube 20 is not limited to this, and may be set as desired. For example, the outer tube 20 may have a plurality of flat surfaces or curved surfaces, and extend in the forward and rearward direction, in a vehicle width direction, and in a vertical direction. Although for example, the dimension of the outer tube 20 in the forward and rearward direction is set to be greater than the dimension of the outer tube 20 in the vehicle width direction and the dimension of the outer tube 20 in the vertical direction, it may be set to be smaller than the dimension of the outer tube 20 in the vehicle width direction and the dimension of the outer tube 20 in the vertical direction.

The muffling space 21 is formed between the outer tube 20 and the first inner tube 18. The muffling space 21 is used to reduce the exhaust noise radiated from the engine 3. The exhaust gas which has flowed through the first inner tube 18 and has been discharged from an opening formed in the downstream end portion 18g of the first inner tube 18 and a plurality of communication holes 18c of the first inner tube 18 flows through the muffling space 21. In this way, the exhaust noise of the engine 3 can be reduced. Alternatively, a plurality of muffling spaces 21 may be formed in the inner passage of the outer tube 20. In this case, two muffling spaces 21 which are apart from each other may be connected to each other via a coupling pipe.

For example, the outer tube 20 includes a first member 25, a second member 26, a third member 27, and a fourth member 28. The first member 25 and the second member 26 define the side portion of the outer tube 20. The cross-section of the first member 25 and the cross-section of the second member 26, which are in a direction perpendicular to the axial direction of the first inner tube 18, have, for example, substantially circular-arc shapes which are symmetric. The first member 25 includes a pair of joining end portions 25a, 25b which extend in the forward and rearward direction and are apart from each other in the circumferential direction of the first inner tube 18. The second member 26 includes a pair of joining end portions 26a, 26b which extend in the forward and rearward direction and are apart from each other in the circumferential direction of the first inner tube 18. In the present embodiment, the pair of joining end portions 25a, 25b, and the pair of joining end portions 26a, 26b are formed by plates, respectively. When the outer tube 20 is viewed from the front, the pair of joining end portions 25a, 25b extend to be apart from the first inner tube 18 in the radial direction of the first inner tube 18, and the pair of joining end portions 26a, 26b extend to be apart from the first inner tube 18 in the radial direction of the first inner tube 18. The first member 25 and the second member 26 are joined to each other in such a manner that the plate surfaces of the joining end portions 25a,26a are joined to each other and the plate surfaces of the joining end portions 25b, 26b are joined to each other. The first member 25 is disposed inward in the vehicle width direction in the exhaust device 11, while the second member 26 is disposed outward in the vehicle width direction in the exhaust device 11.

A recess 20a is provided in a portion of the side surface of the second member 26. The recess 20a extends in the circumferential direction of the outer tube 20, and is recessed (depressed) toward the first inner tube 18. When viewed from the front (in a front view), the recess 20a has a substantially rectangular shape. A first insertion hole 20b into which the downstream oxygen sensor 12 is to be inserted is provided in the inner portion of the recess 20a. In the exhaust device 11, the downstream oxygen sensor 12 is mounted on the outer tube 20 at a location that is apart from the jointing portion of the first member 25 and the joining portion of the second member 26 (a location at which the first member 25 and the second member 26 are joined to each other). Alternatively, the recess 20a may have, for example, a substantially circular shape or a substantially oval shape, when viewed from the front (in a front view). Further, the recess 20a is not an essential element and may be omitted.

For example, the third member 27 is located at an upstream side of the exhaust device 11 and constitutes the front end portion of the outer tube 20. In the present embodiment, the third member 27 is a member of a substantially disc shape. A tubular portion 27a is provided at a center of the third member 27. An upstream end portion 18a of the first inner tube 18 is inserted into the tubular portion 27a. The peripheral edge of the third member 27 is joined to the first member 25 and the second member 26. The tubular portion 27a is joined to the upstream end portion 18a.

For example, the fourth member 28 is located at a downstream side of the exhaust device 11 and constitutes the rear end portion of the outer tube 20. In the present embodiment, the fourth member 28 is a member of a substantially disc shape. A tubular portion 28a is provided at a center of the fourth member 28. A downstream end portion 19a of the second inner tube 19 is inserted into the tubular portion 28a. The peripheral edge of the fourth member 28 is joined to the first member 25 and the second member 26. The tubular portion 28a is joined to the downstream end portion 19a. Note that two or more of the members 25 to 28 may be integrated.

The first inner tube 18 is joined to the tubular portion 27a. The second inner tube 19 is apart from the first inner tube 18 and is joined to the tubular portion 28a. In the present embodiment, the first inner tube 18 and the second inner tube 19 are disposed in such a manner that the axis of the first inner tube 18 and the axis of the second inner tube 19 are deviated from each other. Alternatively, the first inner tube 18 and the second inner tube 19 may be disposed in the forward and rearward direction in such a manner that the axis of the first inner tube 18 and the axis of the second inner tube 19 conform to each other. Further, although the axis of the first inner tube 18 and the axis of the second inner tube 19 extend in parallel, they may extend in different directions. The opening of the downstream end portion 18g of the first inner tube 18 is an exit of the first inner tube 18 and is located inside the muffling space 21, together with the opening of an upstream end portion 19b of the second inner tube 19. Alternatively, a separating (partition) wall may be provided in the inner passage of the outer tube 20, and the outer peripheral surface of at least one of the downstream end portion 18g of the first inner tube 18 and the upstream end portion 19b of the second inner tube 19 may be joined to this separating wall (see separating wall 134 of FIG. 6) to support the first inner tube 18 or the second inner tube 19.

A second insertion hole 18d into which the downstream oxygen sensor 12 is to be inserted is provided in the first inner tube 18 at a location that is downstream of the catalyst unit 23. The second insertion hole 18d is in communication with the inner passage of the first inner tube 18. The plurality of communication holes 18c are provided in the first inner tube 18 at a location that is downstream of the second insertion hole 18d and are in communication with the inner passage of the first inner tube 18. A plurality of communication holes 19c which are similar to the communication holes 18c are provided in the second inner tube 19. The communication holes 18c are an exit of the first inner tube 18. The communication holes 19c are an exit of the second inner tube 19. The communication holes 18c, 19c are in communication with the muffling space 21. The communication holes 18c, 19c may be omitted.

The catalyst unit 23 includes a casing section 23a and a catalyst section 23b. The casing section 23a has a substantially cylindrical shape. The outer peripheral surface of the casing section 23a is in surface contact with the inner peripheral surface of the first inner tube 18. The catalyst section 23b is disposed inside the casing section 23a in a state in which the catalyst section 23b is exposed in the inner passage of the first inner tube 18.

Thermal expansion rates (coefficients of thermal expansion) of the first inner tube 18, the second inner tube 19 and the outer tube 20 may be suitably set. For example, the thermal expansion rate of the outer tube 20 may be set to be higher than those of the first inner tube 18 and the second inner tube 19. In this setting, even when the first inner tube 18 and the second inner tube 19 are thermally expanded due to the high-temperature exhaust gas flowing through the inner passage of the first inner tube 18, and the inner passage of the second inner tube 19, a thermal expansion difference between the first inner tube 18 and the second inner tube 19, and the outer tube 20 can be reduced. As a result, for example, it becomes possible to reduce a stress generated in a region where the first inner tube 18 and the tubular portion 27a are joined to each other, and a stress generated in a region where the second inner tube 19 and the tubular portion 28a are joined to each other. In a method of setting the thermal expansion rates so that the thermal expansion rate of the outer tube 20 is higher than those of the first inner tube 18 and the second inner tube 19, for example, the material of each of the first inner tube 18 and the second inner tube 19 may be different from that of the outer tube 20, or the thickness of each of the first inner tube 18 and the second inner tube 19 may be different from that of the outer tube 20.

The exhaust device 11 may include a single inner tube. In this case, the exhaust device 11 may include a single inner tube extending from the tubular portion 27a of the outer tube 20 toward the tubular portion 28a of the outer tube 20.

The exhaust device 11 further includes a pipe member 30. The pipe member 30 extends from the first inner tube 18 toward the outer tube 20. The pipe member 30 has an insertion space 31 and a female thread 30e. The downstream oxygen sensor 12 is inserted into the insertion space 31. The female thread 30e is threadingly engageable with the male thread 12d of the downstream oxygen sensor 12. A first axial end of the pipe member 30 is joined to the peripheral edge of the second insertion hole 18d of the first inner tube 18. A second axial end of the pipe member 30 is joined to the peripheral edge of the first insertion hole 20b of the outer tube 20. The pipe member 30 is not an essential member and may be omitted. In this case, the downstream oxygen sensor 12 may be directly joined to the peripheral edge of the second insertion hole 18d and to the peripheral edge of the first insertion hole 20b.

The sensors 12, 13 are elongated. The sensor 12 includes a body section 12a, an oxygen detecting section 12b, and a wire 12c. The sensor 13 includes a body section 13a, an oxygen detecting section 13b, and a wire 13c. The body section 12a is formed as a shaft and is formed with the male thread 12d on its outer peripheral surface. The body section 13a is formed as a shaft and is formed with the male thread 13d on its outer peripheral surface. The oxygen detecting section 12b is provided at a first axial end of the body section 12a to detect the oxygen concentration of the exhaust gas. The oxygen detecting section 13b is provided at a first axial end of the body section 13a to detect the oxygen concentration of the exhaust gas. The wire 12c extends from a second axial end of the body section 12a toward the ECU 7 and is connected to the ECU 7. The wire 13c extends from a second axial end of the body section 13a toward the ECU 7 and is connected to the ECU 7.

The downstream oxygen sensor 12 is mounted to the pipe member 30 in a state in which the male thread 12d and the female thread 30e are threadingly engaged with each other. The downstream oxygen sensor 12 is mounted on the first inner tube 18 and the outer tube 20 in a state in which the downstream oxygen sensor 12 is inserted into the insertion holes 18d, 20b via the pipe member 30. The oxygen detecting section 12b is exposed in the inner passage of the first inner tube 18.

The upstream oxygen sensor 13 is mounted on the exhaust pipe 10 in a state in which the male thread 13d is threadingly engaged with the female thread of the exhaust pipe 10. The oxygen detecting section 13b is exposed in the inner passage of the exhaust pipe 10.

The downstream oxygen sensor 12 includes a protruding portion protruding outward from the outer tube 20. The upstream oxygen sensor 13 includes a protruding portion protruding outward from the exhaust pipe 10. Specifically, the protruding portion of the sensor 12 is a portion of the sensor 12 which is located at the second axial end side of the body section 12a, and the protruding portion of the sensor 13 is a portion of the sensor 13 which is located at the second axial end side of the body section 13a. When the vehicle body is viewed from the front, the protruding portion of the downstream oxygen sensor 12 extends upward from the outer tube 20 in such a manner that the protruding portion is tilted with respect to a horizontal direction as it extends outward in the vehicle width direction. When the vehicle body is viewed from the front, the protruding portion of the upstream oxygen sensor 13 extends upward from the exhaust pipe 10 in such a manner that the protruding portion is tilted with respect to a horizontal direction as it extends outward in the vehicle width direction. When the vehicle body is viewed from the front, the sensors 12, 13 are disposed to overlap with each other.

For example, the passage cross-section of the exhaust passage 16 from a location of the first inner tube 18 at which the downstream oxygen sensor 12 is mounted to a location of the exhaust pipe 10 at which the upstream oxygen sensor 13 is mounted has the same shape. The term "the same shape" is not limited to "completely the same shape", and may be the substantially the same shape such as a shape in which the peripheral edge of the passage cross-section of the exhaust passage 16 from a location of the first inner tube 18 at which the downstream oxygen sensor 12 is mounted to a location of the exhaust pipe 10 at which the upstream oxygen sensor 13 is mounted has the same shape in a region that is in a range of 90% or more and 100% or less.

For example, the passage cross-sectional area of the first inner tube 18 at a location at which the downstream oxygen sensor 12 is mounted is equal to the passage cross-sectional area of the exhaust pipe 10 at a location at which the upstream oxygen sensor 13 is mounted. The term "equal " is not limited to "completely equal", and may be "substantially equal", for example, a cross-sectional area ratio S1/S2 between the passage cross-sectional area S1 of the first inner tube 18 at a location of the first inner tube 18 at which the downstream oxygen sensor 12 is mounted and the passage cross-sectional area S2 of the exhaust pipe 10 at a location of the exhaust pipe 10 at which the upstream oxygen sensor 13 is mounted, may be set to a value that is in a range of 0.9 or more and 1.1 or less.

For example, in the exhaust passage 16, a detection region of the downstream oxygen sensor 12, a region at which the catalyst unit 23 is disposed, and a detection region of the upstream oxygen sensor 13 are located on a common axis line E. In the present embodiment, the common axis line E extends in parallel with the axial direction of the first inner tube 18.

The value of an inner diameter ratio D1/D2 between the inner diameter of D1 of the passage cross-section of the first inner tube 18 at a location of the first inner tube 18 at which the downstream oxygen sensor 12 is mounted, and the inner diameter D2 of the passage cross-section of the exhaust pipe 10 at a location of the exhaust pipe 10 at which the upstream oxygen sensor 13 is mounted can be suitably set.

Figure 3:
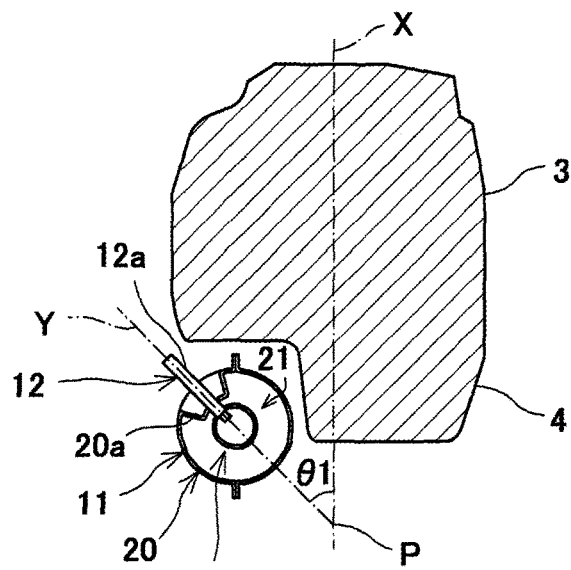
FIG. 3 is a schematic vertical sectional view of an engine and the exhaust device of FIG. 1, when a vehicle body is viewed from the front.

FIG. 3 is a schematic vertical sectional view of the engine 3 and the exhaust device 11 of FIG. 1, when the vehicle body is viewed from the front (in the front view). As shown in FIG. 3, in a case where in the front view, an intersection between a vertical line X extending through the center in the vehicle width direction, of the vehicle body of the straddle-type vehicle 1, in a state in which the vehicle body is upright and an axis line Y extending through the downstream oxygen sensor 12 in the lengthwise direction is an intersection P, an angle θ1 formed between the vertical line X extending upward from the intersection P and the axis line Y extending upward from the intersection P is set to, for example, a value which is greater than 0 degree and smaller than 90 degrees.

In a case where in the front view, an intersection of the vertical line X and an axis line Z extending through the upstream oxygen sensor 13 in the lengthwise direction is an intersection Q, an angle θ2 formed between the vertical line X extending upward from the intersection Q and the axis line Z extending upward from the intersection Q may be be set to a suitable value different from the value of the angle θ1, although this is not shown. In the present embodiment, for example, the angle θ2 is set to be equal to the value of the angle θ1.

As described above, the sensor 12 is mounted on the first inner tube 18 in a state in which the sensor 12 is tilted at the predetermined angle θ1, and the sensor 13 is mounted on the exhaust pipe 10 in a state in which the sensor 13 is tilted at the predetermined angle θ2. In this configuration, a sufficient distance between a road surface and each of the sensors 12, 13 can be secured in a case where the vehicle body is banked to a first side (in the present, right side) in the vehicle width direction, while the straddle-type vehicle 1 is traveling. This makes it possible to well prevent a situation in which the sensors 12, 13 interfere with the road surface or other obstacles and a failure or break occurs in the sensors 12, 13.

Figure 4:
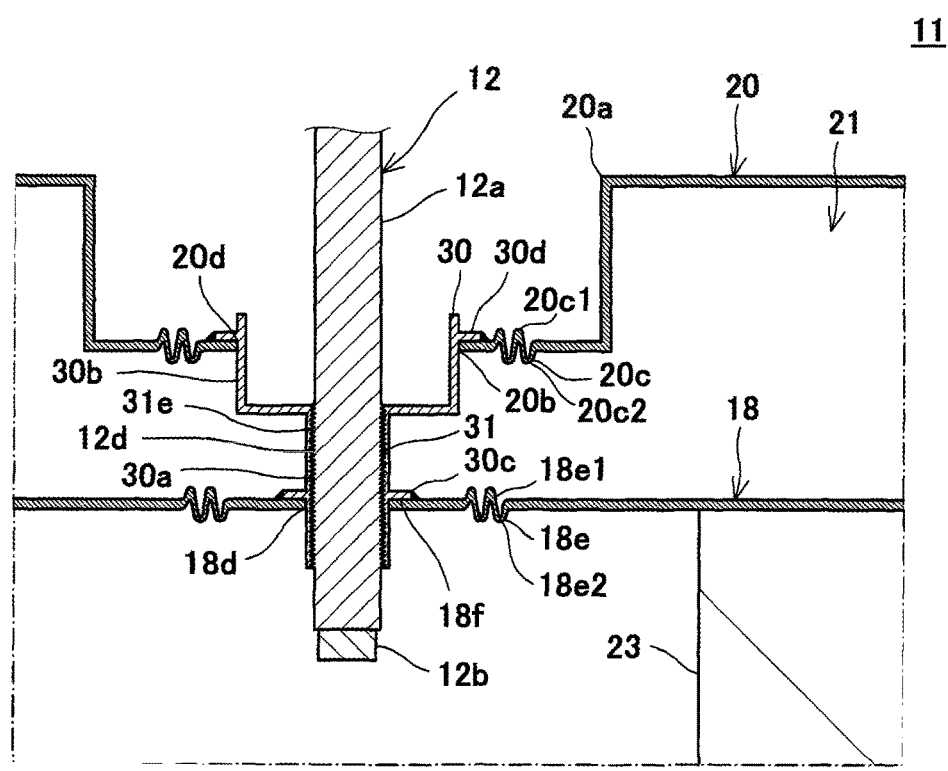
FIG. 4 is a partial cross-sectional view of the exhaust device of FIG. 2.
Figure 5:
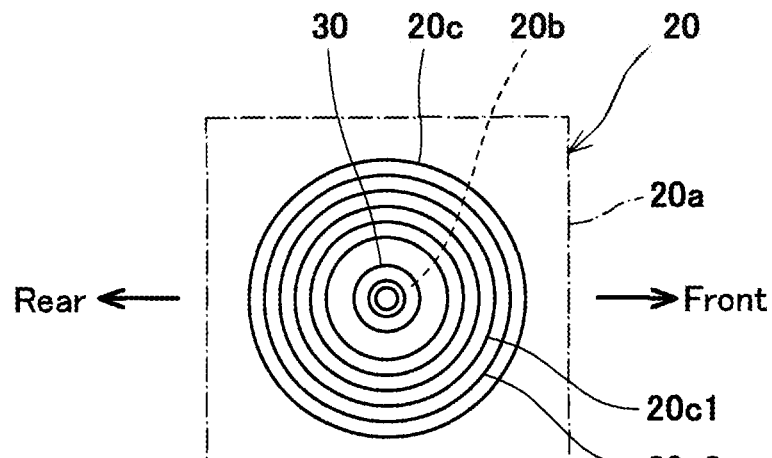
FIG. 5 is a front view of a first insertion hole of FIG. 2.

FIG. 4 is a partial cross-sectional view of the exhaust device 11 of FIG. 1. FIG. 4 shows a partial cross-section of each of the outer tube 20 and the first inner tube 18, including the downstream oxygen sensor 12 in its lengthwise direction. FIG. 5 is a front view of the first insertion hole 20b of FIG. 2.

As shown in FIG. 4, the pipe member 30 includes a body portion 30a, an enlarged diameter portion 30b, a first flange portion 30c, and a second flange portion 30d. The body portion 30a has a cylindrical shape. The body portion 30a has an insertion space 31 in an interior thereof. The body portion 30a extends in the radial direction of the first inner tube 18 the first inner tube 18. The female thread 30e is formed on the inner peripheral surface of the body portion 30a. The enlarged diameter portion 30b has a cylindrical shape. The enlarged diameter portion 30b extends radially outward of the first inner tube 18 from the rear end portion of the body portion 30a. The inner diameter of the enlarged diameter portion 30b is set to a value greater than that of the body portion 30a. Inside the enlarged diameter portion 30b, the outer peripheral surface of the body section 12a of the downstream oxygen sensor 12 is apart from the inner peripheral surface of the enlarged diameter portion 30b.

The first flange portion 30c is provided at a first axial end of the pipe member 30. The first flange portion 30c is provided on the outer peripheral surface of the body portion 30a. The first flange portion 30c is joined to the first inner tube 18 by welding in a state in which the first flange portion 30c is in surface contact with the peripheral edge of the second insertion hole 18d of the first inner tube 18. The second flange portion 30d is provided at a second axial end of the pipe member 30. The second flange portion 30d is provided on the outer peripheral surface of the enlarged diameter portion 30b. The second flange portion 30d is joined to the outer tube 20 by welding in a state in which the second flange portion 30d is in surface contact with the peripheral edge of the first insertion hole 20b of the outer tube 20. In this configuration, the outer tube 20 is provided with a first joining portion 20d joined to the pipe member 30, while the first inner tube 18 is provided with a second joining portion 18f joined to the pipe member 30. The female thread 30e is located inside the outer tube 20. Alternatively, the flange portions 30c, 30d may be omitted. In this case, the body portion 30a is directly joined to the first inner tube 18 by welding, and the enlarged diameter portion 30b is directly joined to the outer tube 20 by welding.

As shown in FIGS. 4 and 5, an extendable/contractible portion 18e is provided at the peripheral edge of the second insertion hole 18d of the first inner tube 18, and an extendable/contractible portion 20c is provided at the peripheral edge of the first insertion hole 20b of the outer tube 20. For example, the extendable/contractible portion 18e has a bellows-like structure in which a mountain fold 18e1 and a valley fold 18e2 are arranged alternately and concentrically with each other around the center axis of the downstream oxygen sensor 12, and the extendable/contractible portion 20c has a bellows-like structure in which a mountain fold 20c1 and a valley fold 20c2 are arranged alternately and concentrically with each other around the center axis of the downstream oxygen sensor 12. The extendable/contractible portion 18e and the extendable/contractible portion 20c have a similar structure. In this way, the exhaust device 11 has a structure in which each of the first joining portion 20d and the second joining portion 18f is permitted to be displaced from its reference position in the axial direction, circumferential direction and radial direction of the first inner tube 18.

In the exhaust device 11, the amount of the permissible displacement from the reference position in the axial direction of the first inner tube 18, of at least one of (both of in the present embodiment) the first joining portion 20d and the second joining portion 18f, is set to be greater than that in the radial direction of the first inner tube 18, of at least one of the first joining portion 20d and the second joining portion 18f. The extendable/contractible portions 18e, 20c are not essential elements and may be omitted.

As described above, in the exhaust device 11, the exhaust gas discharged from the plurality of communication holes 18c and the opening of the downstream end portion 18g which are the exit of the first inner tube 18 is flowed through the muffling space 21, and expanded in the muffling space 21 to attenuate energy of the exhaust gas. In this way, the exhaust noise radiated from the engine 3 can be effectively reduced. In addition, at a location that is downstream of the catalyst unit 23, in the inner passage of the first inner tube 18, the downstream oxygen sensor 12 detects the oxygen concentration of the exhaust gas flowing through the inner passage of the first inner tube 18 after flowing through the catalyst unit 23. This makes it possible to accurately detect the oxygen concentration of the exhaust gas which has been introduced into the first inner tube 18 and has contacted the catalyst unit 23, before the exhaust gas is discharged into the muffling space 21 through the plurality of communication holes 18c and the opening of the downstream end portion 18g.

Since the downstream oxygen sensor 12 is inserted into the first insertion hole 20b, the oxygen detecting section 12b of the downstream oxygen sensor 12 can be easily disposed in the inner passage of the first inner tube 18 covered with the outer tube 20, from an outside region of the outer tube 20, for example, in manufacturing steps of the exhaust device 11.

In the exhaust device 11, the downstream oxygen sensor 12 is mounted on the outer tube 20 in a state in which the downstream oxygen sensor 12 is inserted into the first insertion hole 20b formed in the recess 20a. In this configuration, for example, the downstream oxygen sensor 12 can be easily made close to a location that is downstream of the catalyst unit 23 in the first inner tube 18 covered with the outer tube 20. In addition, the downstream oxygen sensor 12 can be easily mounted on the outer tube 20 even in a case where the dimension of the downstream oxygen sensor 12 in a direction from the outer tube 20 toward the first inner tube 18 is small.

Since the female thread 30e is located inside the outer tube 20, the amount of the protruding portion of the pipe member 30 which protrudes outward from the outer tube 20 can be suppressed, and the downstream oxygen sensor 12 can be easily mounted on the outer tube 20 in a limited space of the straddle-type vehicle 1.

The downstream oxygen sensor 12 is mounted on the inner portion of the recess 20a provided in a portion of the outer tube 20, and thus the muffling space 21 can be formed between the outer tube 20 and the first inner tube 18. In addition, the dimension of the downstream oxygen sensor 12 is not increased, compared to a case where the downstream oxygen sensor 12 is mounted on the first inner tube 18 from an outside region of the outer tube with no recess. In this way, the downstream oxygen sensor 12 can be easily mounted on the exhaust device 11.

In a case where the first inner tube 18 is heated by the high-temperature exhaust gas flowing through the inner passage of the first inner tube 18 and thermally expanded, the first inner tube 18 is sometimes thermally expanded to a greater degree in the axial direction of the first inner tube 18 than in the radial direction of the first inner tube 18. In view of this, in the exhaust device 11, the amount of the permissible displacement from the reference position in the axial direction of the first inner tube 18, of each of the first joining portion 20d and the second joining portion 18f, is set to be greater than that in the radial direction of the first inner tube 18, of each of the first joining portion 20d and the second joining portion 18f. Therefore, for example, even in a case where a thermal expansion difference between the first inner tube 18 and the outer tube 20 occurs due to a temperature difference between the exhaust gas which contacts the first inner tube 18 and the exhaust gas which contacts the outer tube 20, and thereby the first joining portion 20d and the second joining portion 18f are displaced from the reference positions to a greater degree in the axial direction of the first inner tube 18 than in the radial direction of the first inner tube 18, damages to the first joining portion 20d and the second joining portion 18f can be prevented. In this way, it becomes possible to well prevent the damages to the first joining portion 20d or the second joining portion 18f.

Since the outer tube 20 includes the first member 25 and the second member 26 which are joined to each other, an operation for mounting the downstream oxygen sensor 12 on the first inner tube 18 can be easily performed, through, for example, a space formed between the joining portion of the first member 25 and the joining portion of the second member 26, before the first member 25 and the second member 26 are joined to each other. By joining the first member 25 and the second member 26 to each other after the downstream oxygen sensor 12 is mounted on the first inner tube 18, the exhaust device 11 can be easily manufactured.

Since the downstream oxygen sensor 12 is mounted on the outer tube 20 at a location that is apart from the joining portion of the first member 25 and the joining portion of the second member 26 (a location at which first member 25 and the second member 26 are joined to each other), the shape of a member (the first member 25 in the present embodiment) which is either the first member 25 or the second member 26 which does not include a mounting portion for the downstream oxygen sensor 12 is not restricted by the mounting portion. Therefore, for example, the size of the muffling space 21 can be easily increased by the first member 25, and the outer tube 20 can be designed more flexibly. Further, since the wire 12c is disposed in an outside region of the outer tube 20, it can be well protected from the high-temperature of the exhaust device 11.

Since the passage cross-section of the exhaust passage 16 from a location of the first inner tube 18 at which the downstream oxygen sensor 12 is mounted to a location of the exhaust pipe 10 at which the upstream oxygen sensor 13 is mounted has the same shape, a difference in the flow direction between the exhaust gas whose oxygen concentration is detected by the sensors 12 and the exhaust gas whose oxygen concentration is detected by the sensor 13 can be reduced, and detection values of the sensors 12, 13 can be easily compared to each other.

In the exhaust passage 16, the passage cross-sectional area of the exhaust pipe 10 at a location at which the upstream oxygen sensor 13 is mounted is equal to the passage cross-sectional area of the first inner tube 18 at a location at which the downstream oxygen sensor 12 is mounted. This makes it possible to reduce a difference in the flow direction and flow speed between the exhaust gas whose oxygen concentration is detected by the downstream oxygen sensor 12 and the exhaust gas whose oxygen concentration is detected by the upstream oxygen sensor 13. Therefore, the detection value of the downstream oxygen sensor 12 and the detection value of the upstream oxygen sensor 13 can be easily compared to each other.

In the exhaust passage 16, the detection region of the downstream oxygen sensor 12, the region at which the catalyst unit 23 is disposed, and the detection region of the upstream oxygen sensor 13 are located on the common axis line E. Compared to a case where the detection region of the downstream oxygen sensor 12, the region at which the catalyst unit 23 is disposed, and the detection region of the upstream oxygen sensor 13 are located on different axis lines, it becomes possible to further reduce the difference in the flow direction between the exhaust gas whose oxygen concentration is detected by the downstream oxygen sensor 12 and the exhaust gas whose oxygen concentration is detected by the upstream oxygen sensor 13. Therefore, the oxygen concentrations detected by the sensors 12, 13 can be accurately compared to each other.

When the vehicle body is viewed from the front (in the front view), the sensors 12, 13 are disposed to overlap with each other, it becomes possible to suppress a difference in the flow direction between the exhaust gas flowing through the inner passage of the first inner tube 18, whose oxygen concentration is detected by the sensor 12, and the exhaust gas flowing through the inner passage of the exhaust pipe 10, whose oxygen concentration is detected by the sensor 13.

When the vehicle body is viewed from the side (in the side view), the engine 3 is disposed at the center in the forward and rearward direction, of the vehicle body of the straddle-type vehicle 1, and the catalyst unit 23 is disposed below the engine 3, a weight balance of the vehicle body in the forward and rearward direction can be improved. In addition, for example, the engine 3 and the exhaust device 11 can be compactly disposed in the vehicle body in such a manner that they are close to each other in the forward and rearward direction. In this way, the vehicle body can be designed more flexibly. Hereinafter, regarding other embodiments, differences from Embodiment 1 will be mainly described.

(Embodiment 2)

Figure 6:
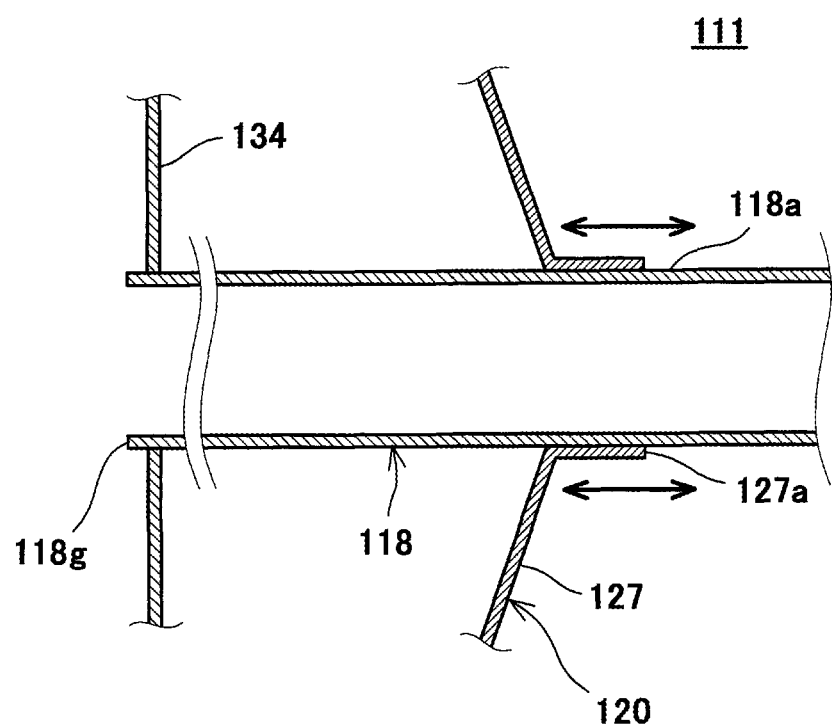
FIG. 6 is a partial cross-sectional view of an exhaust device according to Embodiment 2.

FIG. 6 is a partial cross-sectional view of an exhaust device 111 according to Embodiment 2. FIG. 6 shows a partial cross-section of an upstream tubular portion 127*a* of an outer tube 120 in the axial direction of a first inner tube 118, and an upstream end portion 118*a* of the first inner tube 118 in the axial direction of the first inner tube 118.

As shown in FIG. 6, in the exhaust device 111, in a state in which the tubular portion 127*a* is relatively slidable on the first inner tube 118 in the axial direction of the first inner tube 118, the inner peripheral surface of the tubular portion 127*a* is sealingly in surface contact with the outer peripheral surface of the first inner tube 118. The outer peripheral surface of a downstream end portion 118*g* of the first inner tube 118 is joined to a separating (partition wall) 134 provided inside the outer tube 120.

In the exhaust device 111, since the tubular portion 127*a* is relatively slidable on the first inner tube 118 in the axial direction of the first inner tube 118, the first inner tube 118 can be extended in the axial direction, if the first inner tube 118 is thermally expanded in the axial direction while the exhaust gas is flowing through the first inner tube 118, for example. Therefore, in a case where the upstream end portion 118*a* and the downstream end portion 118*g* of the first inner tube 118 are joined to the outer tube 120 and the separating wall 134, respectively, it becomes possible to effectively prevent a situation in which the first inner tube 118 is thermally expanded in the axial direction to a greater degree than the outer tube 20 is, and thereby buckling of the first inner tube 118 in a direction crossing the axial direction occurs. As a result, the exhaust device 111 can be stably maintained.

(Embodiment 3)

Figure 7:
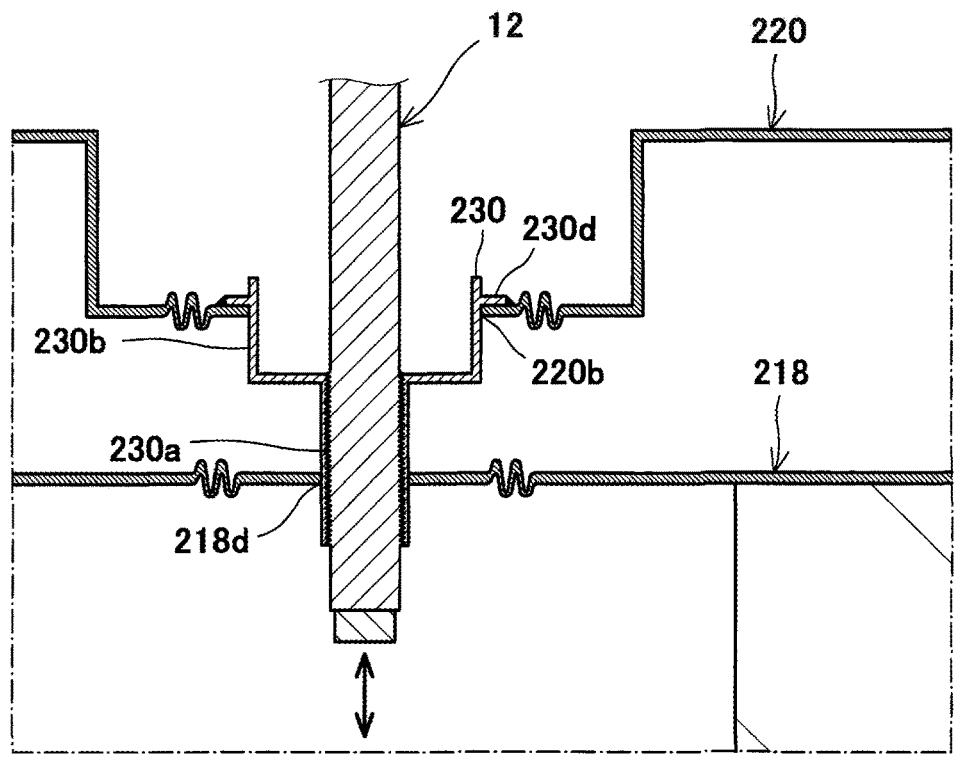
FIG. 7 is a partial cross-sectional view of an exhaust device according to Embodiment 3.

FIG. 7 is a partial cross-sectional view of an exhaust device 211 according to Embodiment 3. As in the example of FIG. 4, FIG. 7 partially shows a radial cross-section of a first inner tube 218 and an outer tube 220, including the downstream oxygen sensor 12 in the lengthwise direction. As shown in FIG. 7, in the exhaust gas device 211, in a state in which a body portion 230*a* of a pipe member 230 is inserted into a second insertion hole 218*d* of the first inner tube 218 and is relatively slidable on the first inner tube 218 in the radial direction of the first inner tube 218, the body portion 230*a* is sealingly in contact with the peripheral edge of the second insertion hole 218*d*. A second flange portion 230*d* of the pipe member 230 is joined to the outer tube 220.

In the exhaust device 211, even when the first inner tube 218 is thermally expanded while the exhaust gas is flowing through the first inner tube 218, the body portion 230*a* is relatively slidable on the first inner tube 218 in the radial direction of the first inner tube 218. This makes it possible to effectively prevent a stress from concentrating on a region which is in the vicinity of a portion of the first inner tube 218 into which the body portion 230*a* is inserted. Therefore, damages to the first inner tube 218 can be prevented well. As a result, the exhaust device 211 can be stably maintained.

Alternatively, in a state in which a first flange portion 230*c* (not shown) of the pipe member 230 is joined to the first inner tube 218, and an enlarged diameter portion 230*b* of the pipe member 230 is inserted into a first insertion hole 220*b* of the outer tube 220 and is relatively slidable on the outer tube 220 in the radial direction of the first inner tube 218, the enlarged diameter portion 230*b* may be in sealing contact with the peripheral edge of the first insertion hole 220*b*. In this case, since the enlarged diameter portion 230*b* is relatively slidable on the outer tube 220 in the radial direction of the first inner tube 218, it becomes possible to well prevent a stress from concentrating on a region which is in the vicinity of a portion of the outer tube 220 into which the pipe member 230 is inserted.

(Embodiment 4)

Figure 8:
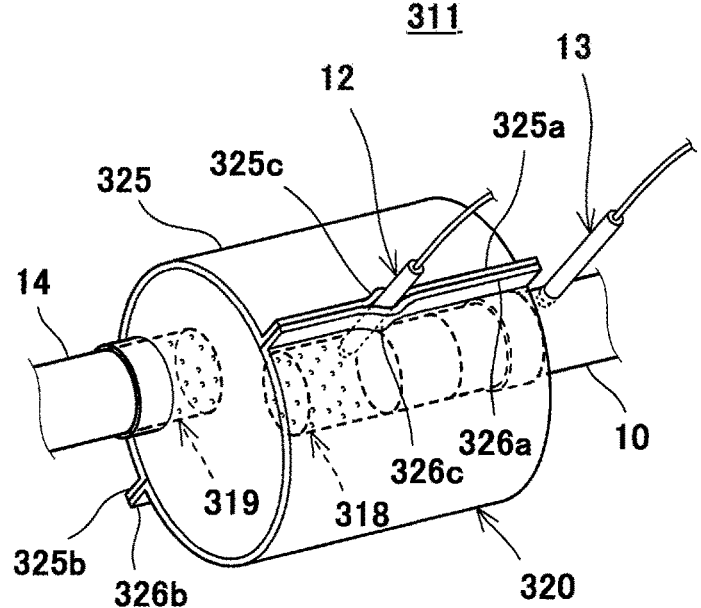
FIG. 8 is a perspective view of an exhaust device according to Embodiment 4, when viewed obliquely from the right and the rear.
Figure 9:
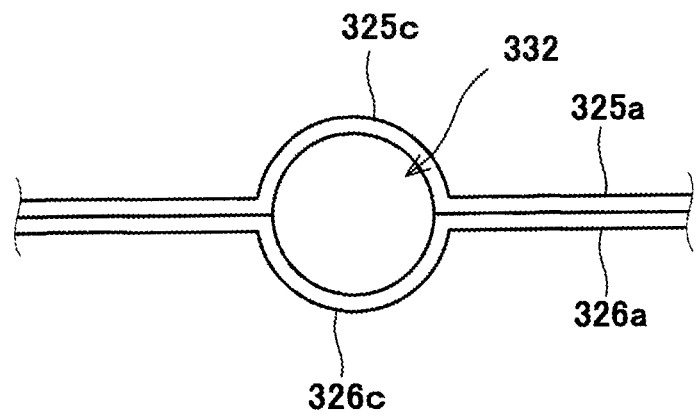
FIG. 9 is a front view of non-joining end portions of FIG. 8.

FIG. 8 is a perspective view of an exhaust device 311 according to Embodiment 4, when viewed obliquely from the right and the rear. FIG. 9 is a front view of non-joining end portions 325*c*, 326*c* of FIG. 8. As shown in FIGS. 8 and 9, a first member 325 and a second member 326 of an outer tube 320 covering a first inner tube 318 and a second inner tube 319 are provided with the non-joining end portions 325*c*, 326*c*, respectively. The non-joining end portions 325*c*, 326c are disposed at intermediate portions in the forward and rearward direction, of the joining portion of the first member 325 and the joining portion of the second member 326, respectively. The non-joining end portions 325c, 326c are apart from the second member 326 and the first member 325, respectively.

In the exhaust device 311, in a state in which the non-joining end portions 325c, 326c face each other, joining end portions 325a, 326a are joined to each other, and joining end portions 325b, 326b are joined to each other, the first member 325 and the second member 326 are joined to each other. In this way, an insertion space 332 into which the downstream oxygen sensor 12 is insertable is formed between the non-joining end portions 325c, 326c. The downstream oxygen sensor 12 is mounted in the inner portion of the insertion space 332.

In the exhaust device 311 having the above-described configuration, the shape of portions of the first member 325 and the second member 326 which are other than the non-joining end portions 325c, 326c are not restricted by mounting the downstream oxygen sensor 12 on the exhaust device 311. The outer tube 320 can be designed more flexibly.

(Embodiment 5)

Figure 10:
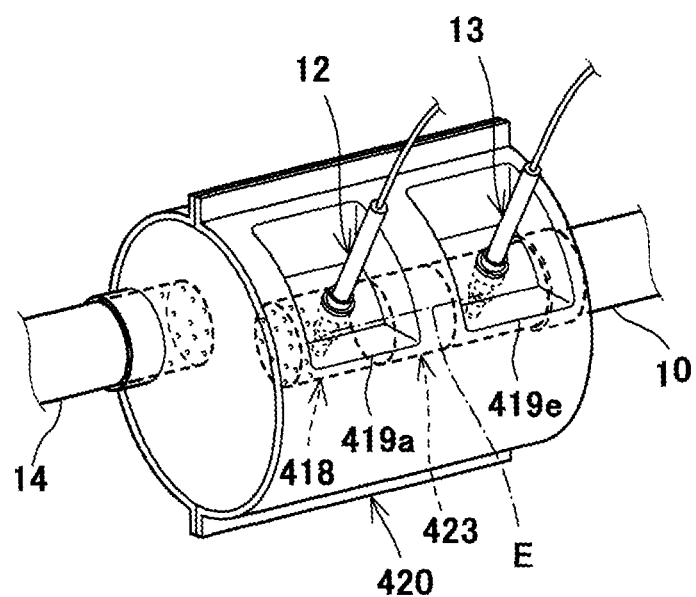
FIG. 10 is a perspective view of an exhaust device according to Embodiment 5, when viewed obliquely from the right and the rear.

FIG. 10 is a perspective view of an exhaust device 411 according to Embodiment 5, when viewed obliquely from the right and the rear. As shown in FIG. 10, in the exhaust device 411, an outer tube 420 is provided with two recesses 420a, 420e. The sensors 12, 13 are mounted on the inner portions of the recesses 420a, 420e, respectively. The upstream oxygen sensor 13 is disposed at a location that is upstream of a catalyst unit 423 to detect the oxygen concentration of the exhaust gas flowing through the inner passage of a first inner tube 418.

For example, the passage cross-section of the first inner tube 418 from a location of the first inner tube 418 at which the downstream oxygen sensor 12 is mounted to a location of the first inner tube 418 at which the upstream oxygen sensor 13 is mounted has the same shape. The term "the same shape" is not limited to "completely the same shape", and may be the substantially the same shape, such as a shape in which the peripheral edge of the passage cross-section of the first inner tube 418 from a location of the first inner tube 418 at which the downstream oxygen sensor 12 is mounted to a location of the first inner tube 418 at which the upstream oxygen sensor 13 is mounted has the same shape in a region that is in a range of 90% or more and 100% or less.

In accordance with this configuration, in the exhaust device 411, a difference in the flow direction between the exhaust gas whose oxygen concentration is detected by the sensor 12 and the exhaust gas whose oxygen concentration is detected by the sensor 13, in the inner passage of the first inner tube 418, Thus, detection values of the sensors 12, 13 can be easily compared to each other.

The passage cross-sectional area of the first inner tube 418 at a location of the first inner tube 418 at which the downstream oxygen sensor 12 is mounted is equal to the passage cross-sectional area of the first inner tube 418 at a location of the first inner tube 418 at which the upstream oxygen sensor 13 is mounted. The term "equal " is not limited to "completely equal", and may be "substantially equal", for example, a cross-sectional area ratio S3/S4 between the passage cross-sectional area S3 of the first inner tube 418 at a location of the first inner tube 418 at which the downstream oxygen sensor 12 is mounted is equal to the passage cross-sectional area S4 of the first inner tube 418 at a location of the first inner tube 418 at which the upstream oxygen sensor 13 is mounted, may be set to a value that is in a range of 0.9 or more and 1.1 or less.

In this configuration, in the exhaust device 411, it becomes possible to reduce a difference in the flow direction and flow speed between the exhaust gas whose oxygen concentration is detected by the downstream oxygen sensor 12 and the exhaust gas whose oxygen concentration is detected by the upstream oxygen sensor 13. Thus, the detection value of the downstream oxygen sensor 12 and the detection value of the upstream oxygen sensor 13 can be more easily compared to each other.

In the exhaust device 411, in the inner passage of the first inner tube 418, a detection region of the downstream oxygen sensor 12, a region at which a catalyst unit 423 is disposed, and a detection region of the upstream oxygen sensor 13 are located on a common axis line E.

In this configuration, in the exhaust device 411, compared to a case where the detection region of the downstream oxygen sensor 12, the region at which the catalyst unit 423 is disposed, and the detection region of the upstream oxygen sensor 13 are located on different axis lines, in the inner passage of the first inner tube 418, it becomes possible to further reduce the difference in the flow direction between the exhaust gas whose oxygen concentration is detected by the downstream oxygen sensor 12 and the exhaust gas whose oxygen concentration is detected by the upstream oxygen sensor 13, in the inner passage of the first inner tube 418. The oxygen concentrations detected by the sensors 12, 13 can be accurately compared to each other.

(Embodiment 6)

Figure 11:
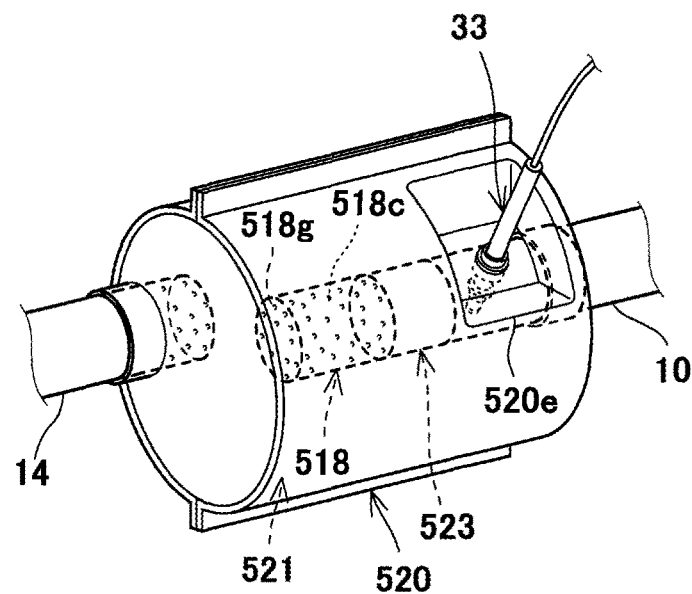
FIG. 11 is a perspective view of an exhaust device according to Embodiment 6, when viewed obliquely from the right and the rear.

FIG. 11 is a perspective view of an exhaust device 511 according to Embodiment 6, when viewed obliquely from the right and the rear. As shown in FIG. 11, in the exhaust device 511, an outer tube 520 is provided with a recess 520e. An upstream oxygen sensor 33 is disposed in the inner portion of the recess 520e, to detect the oxygen concentration of the exhaust gas flowing through the inner passage of a first inner tube 518, at a location that is upstream of a catalyst unit 523, in the inner passage of the first inner tube 518.

In the exhaust device 511 configured as described above, the exhaust gas discharged from a plurality of communication holes 518c and the opening of a downstream end portion 518g of the first inner tube 518 is flowed through a muffling space 521 to attenuate the exhaust noise radiated from the engine 3. In addition, at a location that is upstream of the catalyst unit 523, in the inner passage of the first inner tube 518, the upstream oxygen sensor 33 detects the oxygen concentration of the exhaust gas flowing through the inner passage of the first inner tube 518. This makes it possible to accurately detect the oxygen concentration of the exhaust gas which has been introduced into the first inner tube 518 before the exhaust gas is discharged into the muffling space 521 through the exit which is the communication holes 518c and the opening of the downstream end portion 518g.

(Embodiment 7)

Figure 12:
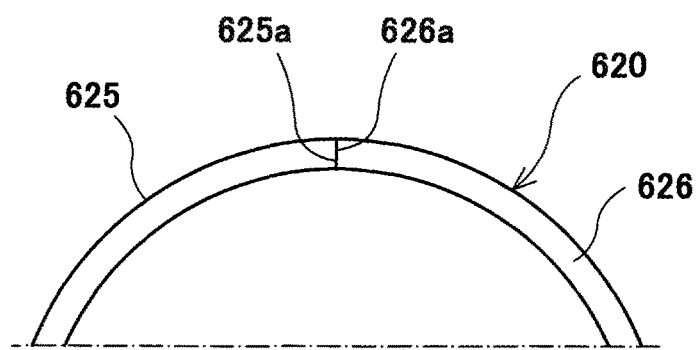
FIG. 12 is a partial rear view of an exhaust device according to Embodiment 7.

FIG. 12 is a partial rear view of an exhaust device 611 according to Embodiment 7. In a rear view of the exhaust device 611, a pair of joining end portions 625a, 626a of an outer tube 620 are curved in the circumferential direction of the outer tube 620, butted with each other and joined to each other, and a pair of joining end portions 625b, 626b (not shown) of the outer tube 620 are curved in the circumferential direction of the outer tube 620, butted with each other and joined to each other. Unlike the joining end portions 25a, 26a, 25b, 26b of the exhaust device 11 of Embodiment 1, the exhaust device 611 does not include a protruding portion protruding radially outward of the first inner tube 18. Therefore, the exhaust device 611 can be configured compactly compared to the exhaust device 11.

The present invention is not limited to the above-described embodiments. The above-described configuration may be changed, added to or deleted from, within a scope of the spirit of the preset invention. The above-described embodiments may be combined. For example, a part of the configuration of one of the embodiments may be applied to other embodiments.

The straddle-type vehicle is not limited to the motorcycle, and may be other kinds of vehicles such as a three-wheeled vehicle, personal watercraft (PWC), a snow mobile, and an all terrain vehicle (ATV).

LIST OF REFERENCE CHARACTERS 1 straddle-type vehicle
3 engine
7 ECU (monitoring unit)
10 exhaust pipe
11, 111, 211, 311, 411, 511, 611 exhaust device
12 downstream oxygen sensor
12a body section of downstream oxygen sensor (protruding portion of downstream oxygen sensor)
12b, 13b oxygen detecting section
12c, 13c wire
13, 33 upstream oxygen sensor
18, 118, 218, 318, 418, 518 first inner tube (inner tube)
18c, 518c flow hole (exit of inner tube)
18d, 218d second insertion hole
18f second joining portion
20, 120, 220, 320, 420, 520, 620 outer tube
20a, 420a, 420e, 520e recess
20b, 220b first insertion hole
20d first joining portion
23b catalyst section (catalyst)
21, 521 muffling space
25, 325 first member
26, 326 second member
30, 230 pipe member
31 insertion space
325c, 326c non-joining end portion (non-joining portion)

The invention claimed is:

1. A straddle vehicle comprising:
an engine which generates driving power for allowing the straddle vehicle to travel and emits an exhaust gas;
an exhaust device including:
a catalyst which contacts the exhaust gas to clean the exhaust gas,
an inner tube in which the catalyst is disposed in an inner passage thereof through which the exhaust gas flows, the inner tube extending to a location that is downstream of the catalyst, in a flow direction of the exhaust gas; and
an outer tube which covers an outer peripheral surface of at least a region of the inner tube in an axial direction of the inner tube, and has a muffling space through which the exhaust gas discharged from an exit of the inner tube is flowed to reduce an exhaust noise radiated from the engine;
at least one exhaust pipe through which the exhaust gas emitted from the engine is led to the catalyst; and
a downstream oxygen sensor which is disposed to detect an oxygen concentration of the exhaust gas flowing through the inner passage of the inner tube after flowing through the catalyst, at a location that is downstream of the catalyst in the inner passage of the inner tube,
wherein the downstream oxygen sensor includes an oxygen detecting section which detects the oxygen concentration of the exhaust gas,
wherein the outer tube is provided with a first insertion hole into which the downstream oxygen sensor is insertable,
wherein the inner tube is provided with a second insertion hole into which the downstream oxygen sensor is insertable,
wherein in a state in which the downstream oxygen sensor is inserted into the first insertion hole, the oxygen detecting section is exposed in the inner passage of the inner tube,
wherein a pipe member having an insertion space into which the downstream oxygen sensor is insertable, is joined to a peripheral edge of the second insertion hole of the inner tube and a peripheral edge of the first insertion hole of the outer tube,
wherein the exhaust device has a structure in which a displacement of each of a first joining portion of the outer tube and a second joining portion of the inner tube, from a reference position, is permissible, the first joining portion and the second joining portion being joined to the pipe member, and
wherein an amount of the permissible displacement from the reference position in the axial direction of the inner tube, of at least one of the first joining portion and the second joining portion, is set to be greater than that in a radial direction of the inner tube, of at least one of the first joining portion and the second joining portion.

2. The straddle vehicle according to claim 1,
wherein the outer tube is provided with a recess which is recessed toward the inner tube,
wherein the recess is provided with the first insertion hole, and
wherein in a state in which the downstream oxygen sensor is inserted into the first insertion hole, the downstream oxygen sensor is mounted on the outer tube.

3. The straddle vehicle according to claim 1,
wherein the downstream oxygen sensor includes a protruding portion protruding outward from the outer tube, and
wherein when a vehicle body is viewed from a front, the protruding portion extends upward from the outer tube in such a manner that the protruding portion is tilted with respect to a horizontal direction as the protruding portion extends outward in a vehicle width direction.

4. The straddle vehicle according to claim 1, further comprising:
an electronic control unit which monitors an output signal of the downstream oxygen sensor,
wherein the downstream oxygen sensor includes a wire connected to the electronic control unit, and
wherein the wire is disposed in an outside region of the outer tube.

5. The straddle vehicle according to claim 1,
wherein the engine is disposed at a center of a vehicle body extending in a forward and rearward direction, the vehicle body being provided with the engine, the exhaust device, and the exhaust pipe, and
wherein when the vehicle body is viewed from a side, the catalyst is disposed below the engine.

6. The straddle vehicle according to claim 1,
wherein the outer tube includes a first member and a second member which are joined to each other.

7. The straddle vehicle according to claim 6,
wherein the downstream oxygen sensor is mounted on the outer tube at a location that is apart from a joining portion of the first member and a joining portion of the second member which are joined to each other.

8. The straddle vehicle according to claim 6,
wherein the first member includes a non-joining portion disposed at an intermediate portion of the joining portion of the first member in such a manner that the non-joining portion of the first member is apart from the second member, and the second member includes a non-joining portion disposed at an intermediate portion of the joining portion of the second member in such a manner that the non-joining portion of the second member is apart from the first member, and
wherein in a state in which the non-joining portion of the first member and the non-joining portion of the second member are disposed to face each other, and the first member and the second member are joined to each other, a space is formed between the non-joining portion of the first member and the non-joining portion of the second member, and the downstream oxygen sensor is inserted into the space formed between the non-joining portion of the first member and the non-joining portion of the second member.

9. The straddle vehicle according to claim 1, further comprising:
an upstream oxygen sensor,
wherein the inner tube extends to a location that is upstream of the catalyst in the flow direction of the exhaust gas, and the upstream oxygen sensor is disposed to detect the oxygen concentration of the exhaust gas flowing through the inner passage of the inner tube, at a location that is upstream of the catalyst, and
wherein a passage cross-section of the inner tube from a location of the inner tube at which the downstream oxygen sensor is mounted to a location of the inner tube at which the upstream oxygen sensor is mounted has the same shape.

10. The straddle vehicle according to claim 9,
wherein a passage cross-sectional area of the inner tube at a location of the inner tube at which the downstream oxygen sensor is mounted is equal to a passage cross-sectional area of inner tube at a location of the inner tube at which the upstream oxygen sensor is mounted.

11. The straddle vehicle according to claim 9,
wherein in the inner passage of the inner tube, a detection region of the downstream oxygen sensor, a region at which the catalyst is disposed, and a detection region of the upstream oxygen sensor are located on a common axis line.

12. A straddle vehicle comprising:
an engine which generates driving power for allowing the straddle vehicle to travel and emits an exhaust gas;
an exhaust device including:
a catalyst which contacts the exhaust gas to clean the exhaust gas,
an inner tube in which the catalyst is disposed in an inner passage thereof through which the exhaust gas flows, the inner tube extending to a location that is upstream of the catalyst in a flow direction of the exhaust gas; and
an outer tube which covers an outer peripheral surface of at least a region of the inner tube in an axial direction of the inner tube, and has a muffling space through which the exhaust gas discharged from an exit of the inner tube is flowed to reduce an exhaust noise radiated from the engine;
at least one exhaust pipe through which the exhaust gas emitted from the engine is led to the catalyst; and
an oxygen sensor which is disposed to detect an oxygen concentration of the exhaust gas flowing through the inner passage of the inner tube, at a location that is upstream of the catalyst in the inner passage of the inner tube,
wherein the oxygen sensor includes an oxygen detecting section which detects the oxygen concentration of the exhaust gas,
wherein the outer tube is provided with a first insertion hole into which the oxygen sensor is insertable,
wherein the inner tube is provided with a second insertion hole into which the oxygen sensor is insertable,
wherein in a state in which the oxygen sensor is inserted into the first insertion hole, the oxygen detecting section is exposed in the inner passage of the inner tube,
wherein a pipe member extending from the inner tube toward the outer tube and having an insertion space into which the oxygen sensor is insertable, is joined to a peripheral edge of the second insertion hole of the inner tube and a peripheral edge of the first insertion hole of the outer tube,
wherein the exhaust device has a structure in which a displacement of each of a first joining portion of the outer tube and a second joining portion of the inner tube, from a reference position, is permissible, the first joining portion and the second joining portion being joined to the pipe member, and
wherein an amount of the permissible displacement from the reference position in the axial direction of the inner tube, of at least one of the first joining portion and the second joining portion, is set to be greater than that in a radial direction of the inner tube, of at least one of the first joining portion and the second joining portion.

13. The straddle vehicle according to claim 12,
wherein the engine is disposed at a center of a vehicle body extending in a forward and rearward direction, the vehicle body being provided with the engine, the exhaust device, and the exhaust pipe, and
wherein when the vehicle body is viewed from a side, the catalyst is disposed below the engine.

* * * * *